Figure 1:
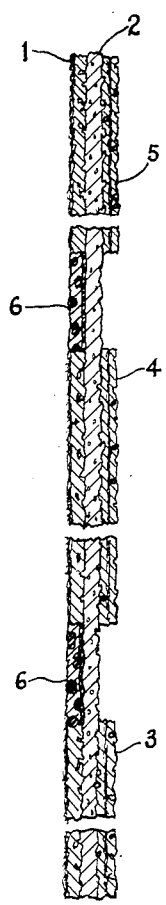

May 8, 1951     J. B. BRENNAN     2,551,869

DIRECT CURRENT ELECTROLYTIC CONDENSER

Original Filed Sept. 18, 1947

*INVENTOR.*

Patented May 8, 1951

2,551,869

UNITED STATES PATENT OFFICE 2,551,869

DIRECT-CURRENT ELECTROLYTIC CONDENSER

Joseph B. Brennan, Bratenahl, Ohio, assignor to Everett D. McCurdy, trustee

Original application September 18, 1947, Serial No. 774,829, now Patent No. 2,547,371. Divided and this application June 9, 1948, Serial No. 32,041

3 Claims. (Cl. 175—315)

This invention relates to electrolytic devices and more particularly to electrolytic condensers, rectifiers and the like wherein one or more of the electrodes is composed of a film-forming material provided with a dielectric film. This invention relates more particularly to electrolytic condensers of the dry or paste type comprising one or more anodes and one or more cathodes.

Such condensers as are the object of this invention are particularly suitable for use on direct current circuits or on circuits where the principal current is unidirectional accompanied by minor A.-C. ripple. Porous plates for such condensers may be made by spray-depositing particles of aluminum or by sintering thin layers of aluminum so that a continuously conductive coherent porous flexible layer is produced as partially described in my U. S. Patent #2,104,018, issued January 4, 1938.

Although direct current condensers embodying anodes made according to the above-mentioned patent have been made commercially for a number of years, it has been commercial practice heretofore to use cathodes comprising only foil electrodes either plain or etched, but which cathodes have not been made of porous metal for the principal reason that heretofore the resultant product would have been too bulky in size compared to competition.

I have found that it is possible and advantageous to make thin flexible cathodes by spray-depositing a continuously conductive porous layer of aluminum onto a soft fibrous base substantially free from chlorides and sulphates and other contaminants, of a resultant thickness no greater than .005" using an electrolytic grade of, for example, paper of approximately .002" in thickness and spray-depositing the aluminum on only one side thereof. This is described more fully in my copending application Serial No. 774,829, filed September 18, 1947, now Patent No. 2,547,371, of which this application is a division-in-part.

The present application also is a continuation-in-part of my copending application Ser. No. 591,909 filed May 4, 1945, which application was itself a continuation of my application which was pending therewith and which thereafter matured into Patent No. 2,375,211.

I have found that a cathode constructed in this way is satisfactory and very advantageous when made so as not to exceed .006" in thickness and when used with an anode in a condenser assembly in properly spaced relationship and impregnated in suitable electrolyte.

According to my invention I have found it advantageous to make the cathode of approximately half the exposed area in contact with the electrolyte compared to the area of the anode in contact with electrolyte. In any case, the area of the cathode in contact with the electrolyte is substantially less than the anode area in contact with the electrolyte in direct current condensers made according to my invention.

This results in a considerable saving in size of the finished unit amounting in any case to at least ten per cent and a considerable saving in metal amounting in excess of ten per cent.

Other great economies are also secured by my invention, such as the saving in heat and energy and labor required in making porous electrodes due to the relative thinness of the cathode compared to the anode.

It is preferred according to my invention that the length and width of the cathodes and anodes involved in the construction of condensers made according to my invention be substantially equal, or the cathode may be slightly greater in length and width. In any case the total area of the cathode in contact with the electrolyte according to my invention is substantially less than the total area of the anode in contact with the electrolyte. Condensers made according to my invention may be stacked or folded or helically interwound as is usual practice. Terminal strips may be attached as of foil by mechanical means such as staking, riveting or by fusion such as welding or combination of these methods.

I prefer to use porous spacers for these electrodes such as of electrolytic grade condenser paper or textile fiber battings free from contaminating amounts of chlorides or sulphates. In any case according to my invention at least a pair of electrodes, one of which is an anode and the other of which is a cathode, is used in aligned relationship with suitable porous spacers and these electrodes are porous substantially throughout.

It is also possible according to my invention to assemble any number of anodes with a common cathode if desired.

It is to be understood that in defining areas according to the sense used herein, I do not intend to include those areas which do not have adjacency of the anodes and cathodes. Thus, if a common cathode is used for two or more anodes the portion of the cathode which does not have an anode opposite and aligned therewith is not considered in my calculations. If desired this portion of the cathode can be blocked off by impregnating it with a non-conducting, non-reacting, non-contaminating lacquer or resin so that this portion of the cathode is non-reactive electrolytically and serves only as a conducting connector between the active sections of the cathode.

Figure 2:
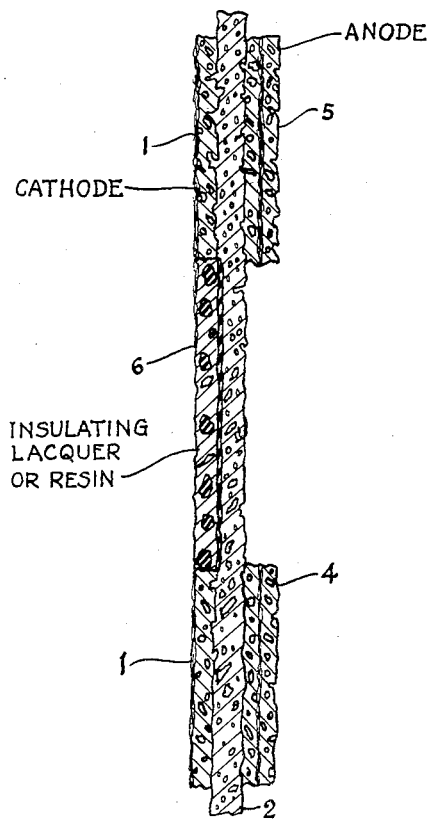

In the accompanying drawing, Figure 1 describes an enlarged, cross section, diagrammatic view of an electrode assembly for an electrolytic condenser and embodying the principles of the invention; and, Figure 2 is a further enlarged diagrammatic detail section of part of the assembly of Figure 1.

Further referring to the drawing, there is provided a cathode 1, of flexible, coherent, particulate porous, film forming metal. A conventional porous spacer 2 is situated adjacent one face of the cathode 1. A plurality of separate anodes 3, 4 and 5 are positioned on the opposed surface of the spacer 2 and in aligned relation to the cathode 1. Those portions of the cathode 1 which are opposite the spaces between the anodes 3, 4 and 5 are impregnated with a current blocking dielectric material 6 so that those portions of the cathode are rendered electrolytically inert although remaining electrically conductive. The impregnation, for example, may be effected by the application of a nonconducting, nonreacting, noncontaminating lacquer or resin. The application of the lacquer or resin usually will result in the formation of an insulating film over a surface of the electrode as well as in the interstices of the electrode, as is indicated by the drawing. It is to be understood that the drawing is diagrammatic and is not drawn to scale, the anode in each instance being of a thickness substantially greater than that of the cathode, as has heretofore been explained.

Having thus described my invention, what I claim is:

1. An electrolytic condenser comprising porous strip anode and cathode, a porous substantially co-extensive electrolytically inert spacer separating said anode from said cathode, said cathode having a thickness of from .002 to .006 inch and comprising a porous electrolytically inert base composed of insulating fibers, said fibers having a porous particulate deposited metallic layer thereon, said deposited layer being continuous and penetrating said base substantially throughout, said anode comprising a porous base having a particulate porous layer of film-forming metal thereon and having substantially more metal and greater thickness than said cathode, and an electrolyte impregnated within said spacer and contacting said electrodes.

2. The electrolytic condenser as defined in claim 1 wherein the said metal of the cathode is deposited entirely on one side of said base.

3. The electrolytic condenser as defined in claim 1 wherein the thickness of said cathode has a smaller dimension than the sum of the initial individual thicknesses of said porous electrolytically inert base and said particulate deposited metal layer.

JOSEPH B. BRENNAN.

REFERENCES CITED

The following references are of record in the file of this patent:

UNITED STATES PATENTS

| Number | Name | Date |
|---|---|---|
| 2,104,019 | Brennan | Jan. 4, 1938 |
| 2,177,819 | Booe | Oct. 31, 1939 |
| 2,213,128 | Langguth | Aug. 27, 1940 |
| 2,280,789 | Brennan | Apr. 28, 1942 |
| 2,446,524 | Brennan | Aug. 10, 1948 |